United States Patent [19]

Boozer et al.

[11] 3,894,999

[45] July 15, 1975

[54] INTERPOLYMER OF AT LEAST TWO MONOOLEFINS AND CERTAIN 5-ALKYLIDENE-2-NORBORNENES

[75] Inventors: Charles E. Boozer; Kenneth H. Wirth, both of Baton Rouge, La.

[73] Assignee: Copolymer Rubber & Chemical Corporation, Baton Rouge, La.

[22] Filed: Mar. 29, 1973

[21] Appl. No.: 346,078

Related U.S. Application Data

[63] Continuation of Ser. No. 2,367, Jan. 12, 1970, abandoned, which is a continuation-in-part of Ser. No. 571,175, Aug. 9, 1966, abandoned, which is a continuation-in-part of Ser. No. 551,963, May 23, 1966, abandoned.

[52] U.S. Cl. ............. 260/80.78; 260/94.9; 260/666
[51] Int. Cl. ............................................. C08f 15/40
[58] Field of Search ................................. 260/80.78

[56] References Cited

UNITED STATES PATENTS

| | | | |
|---|---|---|---|
| 3,093,621 | 6/1963 | Gladding | 260/80.5 |
| 3,151,173 | 9/1964 | Nyce | 260/666 |
| 3,347,944 | 10/1967 | Fritz | 260/666 |
| 3,422,051 | 1/1969 | Carpenter | 260/33.6 |
| 3,574,176 | 4/1971 | Boozer | 260/80.78 |
| 3,753,960 | 8/1973 | Easterbrook | 260/80.78 |

FOREIGN PATENTS OR APPLICATIONS

| | | |
|---|---|---|
| 1,192,770 | 5/1970 | United Kingdom |
| 1,170,406 | 11/1969 | United Kingdom |
| 951,022 | 3/1964 | United Kingdom |

OTHER PUBLICATIONS

Christman and Keim, Macromolecules, 1968, Vol. 1, pp. 358–363.

*Primary Examiner*—Joseph L. Schofer
*Assistant Examiner*—A. L. Clingman

[57] ABSTRACT

A sulfur vulcanizable interpolymer of ethylene, an alpha monoolefin containing 3–16 carbon atoms, such as propylene, and 5-alkylidene-2-norbornene with the ethylene and alpha monoolefin being chemically bound therein in the mole ratio between 95:5 and 20:80 and in which the 5-alkylidene-2-norbornene is present in an amount to provide an effective unsaturation level of at least 2.5 carbon-to-carbon double bonds per 1000 carbon atoms and preferably an interpolymer of ethylene, propylene and 5-ethylidene-2-norbornene.

5 Claims, No Drawings

INTERPOLYMER OF AT LEAST TWO MONOOLEFINS AND CERTAIN 5-ALKYLIDENE-2-NORBORNENES

This application is a continuation of our copending application Ser. No. 2,367, filed Jan. 12, 1970, entitled "Interpolymers of at least two monoolefins and certain 5-ethylidene-2-norbornenes"(now abandoned), which in turn is a continuation-in-part of our then copending application Ser. No. 571,175, filed August 9, 1966, now abandoned, which application was filed as a continuation-in-part of a then copending application Ser. No. 551,963, filed May 23, 1966, now abandoned.

This invention relates to novel sulfur vulcanizable interpolymers of at least two monoolefins and certain 5-alkyli-dene-2-norbornenes, and to a process for preparing the same. The invention further relates to cured elastomers prepared from the interpolymers of the invention.

It is known that elastomers may be prepared by interpolymerizing a monomeric mixture containing ethylene and at least one higher alpha-monoolefin containing 3-16 carbon atoms in solution in an inert organic solvent and in the presence of a Ziegler catalyst. However, the resulting interpolymers are not ethylenically unsaturated and therefore they are not sulfur curable. Substances such as the organic peroxides must be used for curing purposes.

Efforts have been made heretofore to provide ethylenic unsaturation in the above-mentioned class of elastomers by interpolymerizing a polyene with the monoolefins. The interpolymers thus produced have ethylenic unsaturation and may be sulfur vulcanized following prior art practices.

The polyene monomers which have been proposed heretofore have not been entirely satisfactory for a number of reasons. For instance, often the prior art polyene monomers do not enter into the polymerization reaction readily, contain a number of double bonds which enter into the polymerization reaction to thereby produce crosslinked polymers, or the residual carbon-to-carbon double bonds are located in the polymer chain and cause poor ozone resistance. Still other prior art polyene monomers result in low catalyst mileage and have other adverse effects on the polymerization, such as a tendency to produce gel, insoluble polymer, or polymer which tends to deposit on the internal surfaces of the reactor. Also, the prior art diene monomers must be present in the polymer in relatively high concentrations in order to introduce sufficient unsaturation for sulfur vulcanization and, when highly unsaturated polymers are produced, the diene monomer content may adversely affect the polymer properties.

It is an object of the present invention to provide novel sulfur vulcanizable interpolymers prepared from monomeric mixtures containing ethylene, at least one alpha-monoolefin containing 3-16 carbon atoms and a 5-alkylidene-2-norbornene in which the alkylidene group contains from 2 to 5 carbon atoms.

It is a further object to provide a process for preparing the sulfur vulcanizable interpolymers of the invention.

It is still a further object to provide cured elastomers which are prepared from the novel interpolymers of the invention.

Still other objects and advantages of the invention will be apparent to those skilled in the art upon reference to the following detailed description and the examples.

The novel interpolymers of the invention are prepared by interpolymerizing a monomeric mixture containing ethylene, at least one alpha-monoolefin containing 3-16, and preferably 3-10, carbon atoms, and a 5-alkylidene-2-norbornene wherein the alkylidene group contains 2 through 5 carbon atoms, in solution in an inert organic solvent and in the presence of a Ziegler type catalyst to be described more fully hereinafter.

The 5-alkylidene-2-norborene is chemically bound in the elastomer in an amount to provide an effective unsaturation level of at least 2.5, and preferably at least 5, carbon-to-carbon double bonds per 1000 carbon atoms in the polymer; however, much higher effective unsaturation levels are possible such as, for example, 15, 20, 25, 30, 45, 60, 100 or more carbon-to-carbon double bonds per 1000 carbon atoms. The specific effective unsaturation level which is selected in a given intance will vary depending upon the properties which are desired in the elastomer. Interpolymers having effective unsaturation levels of 7-60, and preferably 7-25 carbon-to-carbon double bonds per 1000 carbon atoms are very useful for blending with highly unsaturated rubbers such as diene rubbers. In many instances, interpolymers having effective unsaturation levels of 5-10 carbon-to-carbon double bonds per 1000 carbon atoms are preferred.

In the parent application, description is made of the preparation of interpolymers wherein the monoolefin containing 3-6 carbon atoms is preferably propylene and wherein the molar ratio of ethylene to propylene chemically bound in the interpolymer is within the range of 80:20 to 20:80. While the invention includes interpolymers containing ethylene and propylene in the ratio described above, it has now been found that interpolymers having a number of unexpected unique physical and chemical properties can be produced when the molar ratio of ethylene to propylene or other $C_3$ to $C_{16}$ monoolefin is 80:20 to 90:10 to 95:5. Interpolymers having the higher molar ratio of bound ethylene, within the range described, are characterized by better blend properties when the interpolymer is combined with such highly unsaturated rubbers as natural rubber, cis-1,3-butadiene rubbers, chlorinated rubbers, nitrile rubbers, homopolymers or copolymers of butadiene-styrene or butadiene-acrylonitrile, chloroprene, isoprene and the like rubbers in an uncured or unvulcanized state. Blends of such EPDM rubbers of high ethylene, propylene and 5-alkylidene-2-norbornene with highly unsaturated rubbers of the type described are characterized by increased tensile strength, higher elongation and increased modulus with lower compression set.

In instances where it is desired to prepare a tetrapolymer, or a polymer containing five or more different monomers, then one or more alpha-monoolefins containing 4–16 carbon atoms, and preferably 4–8 carbon atoms, should be substituted for an equal molar quantity of bound propylene in the abovementioned elastomers. For instance, the preferred range for the bound fourth monomer content in tetrapolymers will usually be about 5–20 mole percent, but smaller amounts may be present such as 1, 2, 3 or 4 mole percent.

The polymerization solvent may be any suitable organic solvent which is liquid and inert under the reaction conditions, and it may be a prior art solvent for solution polymerization of monoolefins in the presence of Ziegler catalysts. Examples of satisfactory hydrocarbon solvents include straight chain paraffins containing 5–8 carbon atoms, of which hexane often gives the best results; aromatic hydrocarbons and especially those containing a single benzene nucleus such as benzene, toluene, etc.; and saturated cyclic hydrocarbons which have boiling ranges approximating those for the straight chain paraffin hydrocarbons and aromatic hydrocarbons discussed above, and especially saturated cyclic hydrocarbons containing 5 or 6 carbon atoms in the ring. The solvent selected may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the catalyst to be used in the polymerization step.

The catalyst is prepared from a vanadium compound and trialkyl aluminum and/or alkyl aluminum halides wherein the alkyl groups contain 1–20 and preferably 1–4 carbon atoms. Examples of suitable vanadium compounds include vanadium trichloride, vanadium tetrachloride, vanadium oxychloride, vanadium acetylacetonate, etc. Activators which are specially preferred include alkyl aluminum chlorides of the general formulae $R_1AlCl_2$ and $R_2AlCl$, and the corresponding sequichlorides of the general formula $R_3Al_2Cl_3$, wherein R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually 1 mole of vanadium oxychloride for each 4–10 moles of the alkyl aluminum sesquichloride to thereby provide a ratio of aluminum to vanadium of 8:1 to 20:1.

The polymerization is preferably carried out on a continuous basis in a dry prior art reaction vessel closed to the outside atmosphere, which is provided with an agitator, reactor cooling means, and conduit means for continuously supplying the ingredients of the reaction mixture including monomers and catalyst, and conduit means for continuously withdrawing the solution of elastomer. The polymerization is carried out in liquid phase in the organic solvent and in the presence of the Ziegler catalyst. The solution of elastomer in the polymerization solvent is withdrawn continuously from the reaction vessel, the catalyst is killed by addition of a catalyst deactivator such as methanol or water, and the organic solvent is removed. The solvent may be removed by injecting the solution below the liquid level of a body of boiling water maintained in a vessel to which steam is supplied. The resulting polymer crumb is removed as a slurry from the vessel, and the polymerization solvent is withdrawn overhead as a vapor. The polymer crumb may be stripped free of traces of solvent and washed free of catalyst residues, followed by separating water from the crumb by means of a shaker screen or other device, and drying of the crumb by means of a prior art extrusion dryer or apron dryer. The dried crumb is then ready for baling in accordance with prior art practice.

The elastomers embodying features of the invention contain chemically bound therein the molar ratios of ethylene to propylene varying between 55:45 to 95:5. Specific examples of preferred 5-alkylidene-2-norbornenes include 5-ethylidene-2-norbornene, 5-n-propylidene-2-norbornene, 5-isopropylidene-2-norbornene, 5-n-butylidene-2-norbornene and 5-isobutylidene-2-norbornene. The elastomer prepared from 5-ethylidene-2-norbornene is much preferred as it has outstanding properties and produces many unusual and unexpected results. Halogenated, and especially chlorinated, 5-alkylidene-2-norbornene wherein -alkylidene-alkylidene group contains 2–5 carbon atoms also may be used in preparing the elastomers.

The interpolymers of the invention may be cured following prior art procedures, and special curing techniques are not necessary. As a general rule, a curing procedure which is normally followed in curing highly unsaturated hydrocarbon rubbers such as styrene-butadiene rubber, natural rubber, polybutadiene rubber, synthetic polyisoprene rubber, etc. is satisfactory. Various curing procedures, including the materials and the quantities thereof to be employed, are described in a large number of publications which are well known in the art. These publications include *Principles of High Polymer Theory and Practice*, Schmidt et al., McGraw-Hill Book Company, New York (1948); *Chemistry and Technology of Rubber*, Davis et al., Reinhold Publishing Corporation, New York (1937); *The Applied Science of Rubber*, edited by W. J. S. Naunton, published by Edward Arnold, Ltd., London (1961), *The Encyclopedia of Chemical Technology*, Kirk and Othmer, published by Innerscience Encyclopedia, Inc., New York (1953), and *Compounding Ingredients for Rubbers*, 3rd edition, Cuneo Press of New England, Cambridge, Mass.

As is taught by the above-mentioned texts, rubbery polymers may be vulcanized with vulcanizing agents including, for example, sulfur or sulfur bearing compounds which provide sulfur under the vulcanizing conditions. Sulfur is the preferred vulcanizing agent, and it is usually used in an amount of about 0.5–3, and preferably about 1–2, parts by weight per hundred parts by weight of rubber in the blend. Zinc oxide and other metal oxides may be used in an amount of, for example, about 2–10 parts by weight per 100 parts by weight of rubber (phr). Vulcanization accelerators such as tetramethylthiuram monosulfide, tetramethylthiuram disulfide, the zinc salt of dimethyl dithiocarbamicacid, N,N-diethylthiocarbamyl-2-mercaptobenzothiazole and 2-mercaptozoline may be used.

Conventional fillers and pigments may be incorporated with the rubber, such as about 10–200 phr of carbon black, finely divided silica, esterified silica, titanium dioxide, kaolin, and whiting. It is also possible to oil extend the elastomer. Naphthenic oils for use in processing or extending rubbery polymers are preferred, and are usually added in an amount of about 10–200 phr and preferably about 20–80 phr. Other types of oil may be used, such as the aromatic, highly aromatic and paraffinic oils.

Vulcanization is accomplished by heating the compounded elastomer described above at a vulcanizing temperature and for a period of time sufficient for the vulcanization reaction to occur. A temperature above 130°C for about 10–90 minutes, and preferably about 160°–180°C for about 30 minutes, is often satisfactory. The specific time and temperature that are selected in a given instance will depend upon the nature of the vulcanizing agent, accelerator, and other ingredients which are present. With curing methods that make use of molten salts, temperatures as high as 370°C for 30 seconds are satisfactory.

When carrying out a free radical cure, a heat activated free radical curing agent is admixed with the polymer, and then the mixture is heated to a sufficiently elevated temperature to activate the curing agent and obtain a cure over a practical period of time. Usually, temperatures of about 150°-175°C for a period of several minutes to several hours is sufficient. Preferred free radical curing agents are organic peroxides such as dicumyl hydroperoxide, dibenzoyl peroxide, cumene hydroperoxide, ditertiarybutyl peroxide, and bis (alpha, alpha-dimethyl benzyl) peroxide.

The cured elastomers of the invention may be used in a wide variety of articles, including tires, belts, hose, tubing, etc. For some reason that is not fully understood at the present time, the interpolymers of the invention have a much more rapid cure rate when cured with sulfur than would be predicted from the actual or theoretical carbon-to-carbon double bond content.

It has been discovered unexpectedly that the interpolymers of the invention have an effective unsaturation level that is at least 20% higher, and usually at least 45-50% higher, than the calculated or theoretical unsaturation level which is based upon the amount of chemically bound 5-alkylidene-2-norbornene in the elastomer. In some instances, the effective unsaturation level is up to 75-80% higher than the theoretical. This is surprising, as the elastomers prepared from 5-methylene-2-norbornene and the 5-alkenyl-2-norbornenes, which are the most closely related diene monomers, do not have this unusual property. It is therefore possible to use much less of the expensive diene monomer when preparing the elastomers of the invention, and obtain an equally high effective unsaturation level. In addition to the very substantial economic benefits, the adverse effects on the polymer properties of high levels of diene monomers may be avoided.

The apparently higher than theoretical unsaturation level which is characteristic of the interpolymers of the invention is embraced with the term "effective" unsaturation level in the specification and claims. As is set out in detail hereinafter, the interpolymers described herein may be analyzed to determine the effective unsaturation level by the consumption of bromine, correcting for the substitution reaction by a kinetic method based on the spectrophotometric method developed by Siggia et al., Anal. Chem. 35, 362 (1963). The effective carbon-to-carbon double bond content per 1000 carbon atoms in the interpolymer, which is always at least 20% higher than the theoretical carbon-to-carbon double bond content, is calculated from the resulting data to determine the effective unsaturation level.

It has been further discovered that the interpolymers of the invention have many unusual and unexpected properties over interpolymers having lower unsaturation levels. For instance, at effective unsaturation levels of 5 or more carbon-to-carbon double bonds per 1000 carbon atoms, and preferably 7 or more double bonds per 1000 carbon atoms with interpolymers having a molar ratio of ethylene to propylene of 20:80, 75:25, and effective unsaturation levels as low as 2.5 or more with interpolymers having a molar ratio of ethylene to propylene of 75:25 to 95:5, the interpolymers may be vulcanized readily using curing systems which are normally used for highly unsaturated polymers such as styrene-butadiene rubber, natural rubber, cis-1,4-polybutadiene and synthetic cis-1,4-polyisoprene. This is very unusual, as the ethylene-propylene-diene monomers of the prior art are not capable of being cured with such curing systems. Additionally, the interpolymers of the invention are compatible with the highly unsaturated rubbers above referred to, and may be cocured therewith.

The foregoing detailed discussion and the following specific examples are for purposes of illustration only, and are not intended as being limiting to the spirit or scope of the appended claims.

EXAMPLE I

The reaction vessel was a one-half gallon Sutherland reactor equipped with a high speed, heavy duty, air driven motor, cooling coils, a thermometer, a temperature regulator, a pressure regulator, an injection port, and other openings where monomers, catalyst, and solvent were fed to the reactor. A tube dipping to the bottom of the reactor was present for the removal of the cement which was produced on a continuous basis. A vapor phase vent was provided to bleed off 15% of the gaseous monomer feed to prevent inert gas buildup.

The clean reactor was assembled, rinsed with dry benzene and purged overnight with dry nitrogen. The reactor bowl was heated the next morning with a flameless blowtorch and hot water was run through the coils until the temperature in the reactor was about 70°C. After this, propylene was flushed through the reactor for about 15 minutes. The temperature was lowered to ambient and one liter of Esso chemical grade hexane, which had been dried over 4A molecular sieves and stored over sodium, was added to the reactor. As the temperature was raised to 30°C, propylene was fed to the reactor through a 4A molecular sieve column until 42.2 inches of mercury pressure was reached. The pressure was then raised to 61 inches of mercury with ethylene fed through a 4A molecular sieve column and 11.9 millimoles (1.63 cc) of pure 5-ethylidene-2-norbornene and 1.3 cc of 1.5 M ethylaluminum sesquichloride were added.

The monomer feeds were stopped and the catalyst components, i.e., a 0.525 molar solution of ethylaluminum sesquichloride and a 0.0543 molar solution of vanadium oxytrichloride, at a 12 to 1 aluminum to vanadium ratio, were fed into the reactor at a constant rate until a drop in the pressure was noted. At this time, the gaseous monomers were fed into the reactor through calibrated rotometers at a rate of 1542 cc/minute, of which 696 cc were ethylene and 846 cc were propylene. The 5-ethylidene-2-norbornene was added as a 0.30 molar solution in hexane, which was also 0.009 molar in pyridine, at a rate of 3.53 cc/minute to provide about 8.6 weight percent to be incorporated into the polymer. The polymerization was controlled by the catalyst pumps which added catalyst on demand as the pressure increased, thus maintaining the 61 inches of mercury pressure throughout the run. When the solution in the reactor contained 6% polymer, fresh solvent containing 16 cc of ethylene per cc of solvent was fed into the reactor at the rate of 26.5 cc/minute and the polymer cement was taken off continuously. About 90.4 grams of polymer per hour was produced.

At this time, the ethylene and propylene feeds were adjusted to 346 cc/minute and 1843 cc/minute, respectively, to compensate for the unreacted monomers removed with the cement. The feed rate of the solution of 5-ethylidene-2-norbornene was adjusted to 4.9 cc/minute.

The solution cement as removed from the reactor was fed into a Waring Blender containing water where it was intimately mixed. The cement was then washed three times with equal volumes of water. The washed cement was stabilized with one part by weight based on 100 parts by weight of rubber of a stabilizer (SDAO, a product of Naugatuck Chemical Company) and pre-extended with 20 phr of naphthenic oil, and was fed under nitrogen pressure into a tee joint at the bottom of a 4-liter container filled with hot circulating water. The other end of the tee was connected to a steam line and steam was admitted at a rate to superheat the rubber cement. The solvent and unreacted monomers were mostly removed by this procedure, and the rubber crumb was collected on a screen, washed, chopped up in a Waring Blender and dried in an oven at 90°C. The rubbery copolymer contained ethylene and propylene in a ratio of 60 mole percent of chemically bound ethylene and 40 mole percent of chemically bound propylene as determined by infra-red analysis, using the 720 $cm^{-1}$ absorbance for ethylene and the 968 $cm^{-1}$ absorbance for propylene. The reduced specific viscosity (0.1% in Decalin at 135°C) was 2.76. A 0.1% solution of polymer in Decalin, e.g., 0.1 g of polymer dissolved in 100 cc of Decalin, was used in this and the following examples when measuring the reduced specific viscosity.

Based upon the chemically bound 5-ethylidene-2-norbornene content of the polymer, the calculated or theoretical unsaturation level expressed as carbon-to-carbon double bonds per 1000 carbon atoms was 10.0. The polymer was analyzed for unsaturation by the consumption of bromine as described in detail hereinafter, correcting for the substitution reaction by a differential kinetic method based on the spectrophotometric method developed by Siggia et al., *Anal. Chem.* 35, 362 (1963). The analysis showed that the polymer had an effective unsaturation level of 14.5 double bonds per 1000 carbon atoms, which was about 45% higher than the calculated unsaturation level.

Curing of the dried rubber was effected by compounding in a Brabender plasticorder on a weight basis: 100 parts of rubber, 80 parts of intermediate super abrasion furnace carbon black, 55 parts of a naphthenic rubber processing oil, 5 parts of zinc oxide, 1 part of stearic acid, 0.75 part of mercaptobenzothiazole, 1.5 parts of tetramethylthiuram sulfide, and 1.5 parts sulfur. Curing was for 30 minutes at 150°C.

The hardness was determined on a Shore A durometer. The belt life is the time in hours necessary for a 0.032° cut in a belt to grow to 5 times its original length when it is run on small pulleys in a chamber at 71°C. Heat rise ($\Delta T°F$) was determined by the Goodrich method. Dispersion is a visual rating of the compounded stock. The slope of the cure curve was determined on a Monsanto rheometer.

The cured properties as determined by standard ASTM methods D412-62R, D1646-63, and D395-61-B are given below.

| Raw $ML_4$ | % Elongation | 300% Modulus | Tensile Strength | $\Delta T$ (°F) | Hardness |
|---|---|---|---|---|---|
| 100 | 330 | 2075 | 2350 | 58 | 65 |

| Dispersion | Belt Life Hours | Cure Rate |
|---|---|---|
| Good | 14 | 6.8 |

EXAMPLE II

The general procedure of Example I was followed in this example except where noted to the contrary.

The polymerization temperature was 40°C, the initial charge of 5-ethylidene-2-norbornene to the reactor was in an amount of 6.03 millimoles, and 20 microliters of pyridine was also added.

The catalyst was prepared from a 0.545 molar solution of ethylaluminum sesquichloride and a 0.054 molar solution of vanadium oxychloride, using a 12:1 aluminum to vanadium ratio. The gaseous monomers were fed continuously to the reactor after the initial charging of monomers at a rate of 1501 cc/minute, of which 692 cc were ethylene and 809 cc were propylene. The 5-ethylidene-2-norbornene was added as a 0.30 molar solution in hexane, which also was 0.01 molar in puridine, at a rate of 3.57 cc/minute to thereby provide 8.6 weight percent to be incorporated into the polymer. The fresh solvent was fed into the reactor at the rate of 27.8 cc/minute, and the rate of production of polymer was 90.4 grams per hour.

When commencing to withdraw the cement from the reactor on a continuous basis, the ethylene and propylene feeds were adjusted to 310 cc/minute and 1645 cc/minute, respectively, to compensate for the unreacted monomers removed with the cement. The feed rate of the hexane solution of 5-ethylidene-2-norbornene was adjusted to 4.23 cc/minute. After washing the cement with three equal volumes of water, it was pre-extended with 10 parts by weight of naphthenic oil for each 100 parts by weight of polymer.

The terpolymer contained ethylene and propylene in a ratio of 59 mole percent of chemically bound ethylene and 41 mole percent of chemically bound propylene by infra-red analysis and had a reduced specific viscosity (0.1% in Decalin at 135°C) of 1.88.

The calculated or theoretical level of unsaturation based upon the amount of chemically bound 5-ethylidene-2-norbornene in the terpolymer was 10 carbon-to-carbon double bonds per 1000 carbon atoms. The effective unsaturation level, as determined by the analytical procedure of Example I, was 15 carbon-to-carbon double bonds per 1000 carbon atoms. Thus the polymer had an effective unsaturation level which was approximately 50% higher than the calculated unsaturation level.

EXAMPLE III

The general procedure of Example I was followed in this example, except as noted hereinafter.

The polymerization temperature was 25°C, the initial charge of the 5-ethylidene-2-norbornene to the reactor was 24.2 millimoles, and 20 microliters of pyridine was added. The catalyst was prepared from a 1.06 molar solution of ethyl-aluminum sesquichloride and a 0.105 molar solution of vanadium oxytrichloride, using a 12:1 aluminum to vanadium ratio.

The feed of gaseous monomers to the reactor on a continuous basis after the initial charge was at a rate of 1698 cc/minute, of which 709 cc were ethylene and 989 cc were propylene. The 5-ethylidene-2-norbornene was added as a 0.5 molar solution in hexane, which was also 0.023 molar in pyridine, at a rate of 6.31 cc/minute to thereby provide 22 weight percent to be incorporated into the polymer. The fresh solvent was fed to the reactor at the rate of 28.2 cc/minute, when continuous operation was commenced, and the polymer was reduced at the rate of 105 grams per hour.

Upon commencing continuous operation, the ethylene and propylene feeds were adjusted to 343 cc/minute and 2193 cc/minute, respectively, to compensate for the unreacted monomers removed with the cement. The feed rate of the 5-ethylidene-2-norbornene solution was increased to 8.13 cc/minute.

The resulting polymer contained ethylene and propylene in a ratio of 63 mole percent of chemically bound ethylene, and 37 mole percent of chemically bound propylene as determined by infra-red analysis. The reduced specific viscosity (0.1% in Decalin at 135°C) was 1.24.

The calculated or theoretical unsaturation level based upon the amount of chemically bound 5-ethylidene-2-norbornene in the terpolymer was 25 carbon-to-carbon double bonds per 1000 carbon atoms. The effective level of unsaturation as determined by the analytical procedure of Example I was 45 carbon-to-carbon double bonds per 1000 carbon atoms. The effective unsaturation level was 80% greater than the calculated or predicted unsaturation level.

EXAMPLE IV

The general procedure of Example I was followed in this example, except as noted hereinafter.

The polymerization temperature was 30°C, and the initial charge to the reactor contained 5.82 millimoles of 5-methylene-2-norborene and 20 microliters of pyridine.

The catalyst was prepared from a 0.39 molar solution of ethylaluminum sesquichloride and a 0.040 molar solution of vanadium oxytrichloride, using a 12:1 aluminum to vanadium ratio. The gaseous monomers were fed continuously to the reactor at a rate of 1666 cc/minute, of which 713 cc were ethylene and 953 cc were propylene. The 5-methylene-2-norbornene was added as a 0.13 molar solution in hexane, which also was 0.008 molar in pyridine, at a rate of 5.55 cc/minute to thereby provide 5.3 weight percent to be incorporated in the polymer. When the solution contained 5% polymer, fresh solvent containing 16 cc of ethylene per cc of solvent was fed to the reactor at a rate of 29.8 cc/minute, and the polymer cement was removed continuously from the reactor. The polymer was produced at a rate of 87 grams per hour.

At the time of commencing continuous operation, the ethylene and propylene feeds were adjusted to 381 cc/minute and 2071 cc/minute, respectively, to compensate for the unreacted monomers removed with the cement. The feed rate of the solution of 5-methylene-2-norbornene was adjusted to 7.3 cc/minute.

The resulting polymer contained ethylene and propylene in a ratio of 63 mole percent of chemically bound ethylene and 37 mole percent of chemically bound propylene as determined by infra-red analysis. The polymer had a reduced specific viscosity (0.1% in Dacalin at 135°C) of 3.25.

The calculated or theoretical unsaturation level based upon the amount of chemically bound 5-methylene-2-norbornene in the polymer was 7.0 carbon-to-carbon double bonds per 1000 carbon atoms. The effective unsaturation level as determined by the analytical procedure of Example I was 7.4 double bonds per 1000 carbon atoms. This small difference between the theoretical unsaturation level and the effective unsaturation level as determined by the analytical procedure is within experimental error and/or due to terminal unsaturation in the polymer chains. Thus, the effective and theoretical unsaturation are equal when using 5-methylene-2-norbornene as the third monomer.

EXAMPLE V

The procedure followed in this example was the same as employed in Example I, except as noted hereinafter.

The reaction temperature was 25°C and the initial charge to the reactor contained 34.6 millimoles of 5-(2-methyl-2-butenyl)-2-norbornene and 20 microliters of pyridine. The catalyst was prepared from a 1.06 molar solution of ethylaluminum chloride and a 0.105 molar solution of vanadium oxytrichloride, using a 12:1 molar ratio of aluminum to vanadium.

The continuous feed of the gaseous monomers to the reactor after the initial charge was at a rate of 1726 cc/minute, of which 711 cc were ethylene and 1015 cc were propylene. The 5-(2-methyl-2-butenyl)-2-norbornene was added as a 0.5 molar solution in hexane, which also was 0.01 molar in pyridine, at a rate of 6.89 cc/minute to thereby provide about 29 weight percent to be incorporated into the polymer. When the solution in the reactor contained 7 weight percent of polymer, fresh solvent containing 16 cc of ethylene per cc of solvent was fed to the reactor at a rate of 27 cc/minute, and the polymer cement was removed continuously. The polymer was produced a rate of 126 grams per hour.

At the time of commencing continuous operation, the ethylene and propylene feeds were adjusted to 363 cc/minute and 2205 cc/minute, respectively, to compensate for the unreacted monomers removed with the cement. The feed rate of the solution of 5-(2-methyl-2-butenyl)-2-norbornene was increased to 9.36 cc/minute.

The resulting polymer contained ethylene and propylene in a ratio of 66 mole percent of chemically bound ethylene and 34 mole percent of chemically bound propylene as determined by infra-red analysis. The polymer had a reduced specific viscosity (0.1% in Decalin at 135°C) of 1.12.

The calculated or theoretical unsaturation level based upon the amount of chemically bound 5-(2-methyl-2-butenyl)-2-norbornene in the polymer was 25 carbon-to-carbon double bonds per 1000 carbon atoms. The effective unsaturation level as determined by the analytical procedure of Example I was 27 carbon-to-carbon double bonds per 1000 carbon atoms. The slight increase in the unsaturation level as determined by the analytical procedure was within experimental error and/or was due to terminal unsaturation at the ends of the polymer chains.

EXAMPLE VI

The following example represents the manufacture of an EPDM rubber having bound ethylene to propylene in the ratio of 83:17 and with an actual unsaturation level of about 5 carbon-to-carbon double bonds per 1000 carbon atoms.

The reaction vessel was a one-gallon Sutherland reactor equipped with a high speed, heavy duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70°C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 41°C, propylene was fed to the reactor through a 4A molecular sieve column until 19.7 inches Hg pressure was reached. The pressure was then brought up to 30 psi with ethylene fed through a 4A molecular sieve column and approximately 0.12 ml pyridine inhibitor and 2.6 cc of 1.5 M ethylaluminum sesquichloride were added.

The monomers were shut off and the catalysts, .165 molar ethylaluminum sesquichloride and .005 molar vanadium oxytrichloride at a 40 to 1 aluminum to vanadium ratio, were fed into the reactor at a constant rate until a drop in pressure in the reactor was noted. Also added 0.35 M butyl perchlorocrotonate at 7 to 1 ratio on vanadium. At this time the gaseous monomers were fed into the reactor through suitable calibrated rotometers at a rate of 2864 cc/minute, of which 2224 cc were ethylene and 640 cc were propylene; the termonomer 5-alkylidene-2-norbornene was added as a 0.33 M solution in hexane at 3.28 cc/ninute which provided about 4.3 weight percent to be incorporated into the polymer. The polymerization was controlled by the catalyst pumps which added catalyst on demand as the pressure increased, thus maintaining the 30 psi pressure throughout the run. When the solution became approximately 7% polymer, solvent containing 16 cc/cc ethylene was fed at the rate of 51.2 cc/minute into the reactor and the polymer cement taken off which produced about 180 g of polymer per hour.

At this time the ethylene and propylene feeds were adjusted to 1601 cc/minute and 1534 cc/minute to compensate for the unreacted monomers removed with the cement.

The solution cement as removed from the reactor was fed into a Waring Blender containing water where it was intimately mixed. The cement was then washed three times with equal volumes of water. The washed and stabilized cement (1 phr on the rubber of the experimental stabilizer Tergonox 1010 (Geigy) was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blender. The rubber crumb was dried in the oven at 90°C to remove any remaining solvent and water giving a rubbery copolymer which contained 84 mole percent ethylene analysis, and had a reduced specific viscosity in Decalin at 135°C of 2.75. The unsaturation expressed in C=C/1000 carbon atoms was 4.8.

Curing of the dried rubber was effected by compounding in a Brabender plasticorder (or Banbury size B mixer) based on 100 parts of oil-extended rubber (40 parts oil to 100 parts polymer), 200 parts carbon black, 135 parts of a naphthenic rubber processing oil, 5 parts of zinc oxide, 1 part of stearic acid, 3 parts methyl tuads, 0.5 parts Coaptax, and 1.5 parts sulfur.

The hardness was determined on a Shore A durometer. Heat rise ($\Delta T°F$) is by the Goodrich method. The slope of the cure curve was determined on a Monsanto rheometer at 250°C.

| Run | Ml 1+8 min. | % Elong. | 300% Mod. | Tensile | Hardness | Cure Rate |
|---|---|---|---|---|---|---|
| 298–45–364 | 70 | 270 | 1175 psi | 1425 psi | 73 | 9.8 |

EXAMPLE VII

The following example represents the preparation of an EPDM rubber having a ratio of bound ethylene to propylene of 90:10 with an unsaturation level of 2 carbon-to-carbon double bonds per 1000 carbon atoms.

The reaction vessel was a one-gallon Sutherland reactor equipped with a high speed, heavy duty, air driven motor; cooling coils; a thermometer; a temperature regulator; a pressure regulator; an injection port; and other openings where monomers, catalyst, and solvent were fed to the reactor. A tube dipping to the bottom of the reactor was present for the removal of the cement produced on a continuous basis. A vapor phase vent was provided to bleed off 15% of the gaseous monomer feed to prevent inert gas buildup.

The clean reactor was assembled, rinsed with dry hexane and purged overnight with dry nitrogen. In the morning the reactor bowl was heated with a flameless blowtorch and hot water was run through the coils until the temperature in the reactor was about 70°C. After this, propylene was flushed through the reactor for about 15 minutes; then the temperature was lowered to ambient and two liters of Esso chemical grade hexane, dried over 4A molecular sieves and stored over sodium, was added to the reactor. As the temperature was brought to 60°C, propylene was fed to the reactor through a 4A molecular sieve column until 19.2 inches Hg pressure was reached. The pressure was then brought up to 30 psi with ethylene fed through a 4A molecular sieve column and approximately 0.12 ml pyridine inhibitor and 2.6 cc of 1.5 M ethylaluminum sesquichloride were added.

The monomers were shut off and the catalysts, 0.30 molar ethylaluminum sesquichloride and 0.009 molar vanadium oxytrichloride at a 40 to 1 aluminum to vanadium ratio, were fed into the reactor at a constant rate until a drop in pressure in the reactor was noted. Also added 0.063 M butyl perchlorocrotonate at 7 to 1 vanadium. At this time the gaseous monomers were fed into the reactor through suitably calibrated rotometers at a rate of 2139 cc/minute, of which 1780 cc were ethylene and 359 cc were propylene; the termonomer ethylidene norbornene was added as a 0.09 M solution in hexane at 3.27 cc/minute which provided about 1.71 weight percent to be incorporated into the polymer. The polymerization was controlled by the catalyst pumps which added catalyst on demand as the pressure increased, thus maintaining the 30 psi pressure throughout the run. When the solution became approximately 5% polymer solvent containing 16 cc/cc ethylene was fed at the rate of 51.0 cc/minute into the reactor and the polymer cement taken off which produced about 123 g of polymer per hour.

At this time the ethylene and propylene feeds were adjusted to 1113 cc/minute and 792 cc/minute to compensate for the unreacted monomers removed with the cement.

The solution cement as removed from the reactor was fed into a Waring Blender containing water where it was intimately mixed. The cement was then washed three times with equal volumes of water. The washed and stabilized cement (1 phr on the rubber of the experimental stabilizer Tergonox 1010) was fed with nitrogen pressure into a tee joint at the bottom of a 4-liter container full of hot circulating water. The other end of the tee is connected to a steam line and steam was admitted at such a rate as to superheat the rubber cement. The solvent and unreacted monomers were mostly removed by this procedure. The rubber crumb was collected on a screen, washed and chopped up in a Waring Blender. The rubber crumb was dried in the oven at 90°C to remove any remaining solvent and water giving a rubbery copolymer which contained 90.4 mole percent ethylene by infra-red analysis, and had a reduced specific viscosity in Decalin at 135°C of 2.26. The actual unsaturation expressed in C=C/1000 carbon atoms was 1.7.

The elastomeric interpolymers described herein are analyzed as set out below to determine the effective unsaturation level by the consumption of bromine correcting for the substitution reaction by a differential kinetic method based on the spectrophotometric method developed by Siggia et al., *Anal. Chem.* 35, 362 (1963). The basis of the method is the determination of the differences in rates of addition and substitution of brome ($Br_2$) with ethylenically unsaturated linkages. The rate of reaction is determined by monitoring the disappearance of the bromine photometrically as a function of time. A sharp break occurs when the rapid addition reaction to the carbon-to-carbon double bonds is complete and the slow substitution reaction continues. Extrapolation of a kinetic plot (pseudo first order) to a time of "0" will give the amount of bromine remaining after addition to the carbon-to-carbon double bonds was complete. The change in bromine concentration is taken as the measure of the effective unsaturation level in the elastomer. Actual unsaturation is about 60% of effective unsaturation as determined by the following procedure.

Materials
1. Bromine solution, 0.0125 Molar in $CCl_4$ (2.0 g of $Br_2$/liter of $CCl_4$).
2. Aqueous potassium iodide solution containing 10 grams of KI in 100 m of water.
3. Mercuric chloride catalyst solution containing 0.2 g of mercuric chloride dissolved in 100 ml of 1,2-dichloroethane.
4. Starch indicator solution.
5. Aqueous sodium thiosulfate solution, 0.01 Normal accurately standardized.
6. Carbon tetrachloride, reagent grade.
7. Spectrophotometer (visible range) having sample and reference cells that can be stoppered.
8. Stopwatch (if a non-recording photometer is used).

Calibration
1. With the standard 0.01 N $Na_2S_2O_3$ solution titrate to the starch-iodine endpoint duplicate 10.00 ml samples of the 0.0125 M bromine solution to which 5 ml of the 10% KI solution and 25 ml of distilled water have been added.
2. From the standard 0.0125 M bromine solution, prepare a series of five calibration standards of the following concentrations: 0.5, 1, 2, 3 and 4 millimoles of $Br_2$/liter.
3. Determine the absorbance in the sample cell of each of the five calibration standards at a wave length setting of 415 m$\mu^1$ versus $CCl_4$ in the reference cell. Then prepare a plot from the resulting data of absorbance versus the exact concentration of $Br_2$ contained in the calibration standards, plotted as millimoles of $Br_2$/liter, to obtain a calibration curve.
4. Determine the slope of the calibration curve thus obtained for use in the equation:

$$Br_2 \text{ in millimoles/liter} = \text{Absorbance} \times \frac{1}{\text{slope of calibration curve}}$$

Analysis
1. Dissolve about 1.25 grams of the dry polymer to be analyzed in 50 ml of $CCl_4$ (or take sufficient polymer cement to contain about 1.25 grams of the polymer). Precipitate the polymer by pouring the solution into 400 ml of isopropyl alcohol with vigorous stirring provided by a Waring Blender.
2. Filter the precipitated polymer and squeeze out the excess liquid.
3. Dissolve the once precipitated polymer from Step 2 in 50 ml of $CCl_4$, precipitate the polymer again by pouring into 400 ml of isopropyl alcohol as in Step 1, and filter and remove excess liquid as in Step 2.
4. Immediately redissolve the twice precipitated undried polymer from Step 3 in about 50 ml of $CCl_4$ in a Waring Blender. Filter the solution through glass wool into a 2-ounce narrow-mouthed bottle that can be stoppered to prevent evaporation. Determine the solids content by evaporation of duplicate 5.0 ml samples of the polymer solution. A hypodermic syringe is convenient for measuring the polymer solutions.
5. Set the spectrophotometer at the wavelength of 415 m$\mu$.
6. Check the concentration of the 0.0125 M bromine solution daily before use by determining the absorbance of a known dilution.

7. To the sample photometer cell, add 1.00 ml of the 0.2% $HgCl_2$ solution as a catalyst, and 1.00 ml of the standard 0.0125 M solution of bromine in $CCl_4$.
8. Prepare a polymer blank by adding to the reference cell 0.50 ml of the polymer solution from Step 4, 1.50 ml of $CCl_4$ and 1.00 ml of the 0.2% $HgCl_2$ solution, shake well, and place the photometer reference cell in the instrument.
9. Discharge 0.50 ml of the polymer solution[2] and 0.50 ml of $CCl_4$ into the photometer cell containing the catalyst and bromine solution from a hypodermic syringe starting the stopwatch the instant of mixing (or the recorder if a recording spectrophotometer is used). Stopper the cell and thoroughly agitate the mixture before placcing the cell in the instrument.
10. Record the 415 m$\mu$ wavelength absorbance of the mixture at one minute intervals. Continue recording time and absorbance values until the faster addition rate of bromine to the double bonds is complete and the slower substitution reaction is well defined. (Usually 10–15 minutes is sufficient). Prepare a plot from the resulting data of absorbance versus time to obtain an absorbance curve for the analyzed sample.

Calculations

1. Extrapolate the linear portion of the absorbance curve (i.e., the portion for the substitution reaction) for the analyzed sample to zero time[3], and record the absorbance value for zero time.
2. Determine the final $Br_2$ concentration by inserting the absorbance value at zero time which was obtained above, and the slope of the calibration curve, in the following equation. The final $Br_2$ concentration, which is the concentration of $Br_2$ at the end of the rapid addition reaction, is then calculated.

$$\text{Final Br}_2 \text{ concentration in millimoles/liter} = \text{Absorbance at zero time} \times \frac{1}{\text{slope of calibration curve}}$$

3. Calculate the effective unsaturation level as carbon-to-carbon double bonds per 1000 carbon atoms in the polymer from the following equation:

$$\text{Effective unsaturation level expressed as carbon-to-carbon double bonds per 1000 carbon atoms in the polymer} = \frac{(A-B)(C)(14)(100)}{(1000)(D)(E)}$$

Where A = initial $Br_2$ concentration, millimoles/liter
B = final $Br_2$ concentration, milimoles/liter
C = milliliters of solution in the sample photometer cell
D = % solids of polymer in the polymer solution (based on the weight of the polymer in grams/volume of the solvent in milliliters)
E = milliliters of the polymer solution in the sample photometer cell.

[1]The spectrophotometer should be adjusted to the wavelength setting of maximum absorption since the bromine absorption curve is very sharp and even small errors in the wavelength setting cannot be tolerated.
[2]The sample size elected will permit analysis of polymers containing 2 to 10 C=C/1000 carbon atoms. Polymers with unsaturation levels above this range can be analyzed but the polymer concentration must be reduced proportionately.
[3]Extrapolation of the absorbance curve for the sample being analyzed gives essentially the same results as extrapolation of a kinetic plot but with a considerable saving in time.

When the third monomer comprises a 5-alkylidene-2-norbornene in which the alkylidene group has from 2 to 5 carbon atoms, the amount of unsaturation will be 60% of the effective unsaturation when the calculation for unsaturation is made by the procedure previously described.

WE CLAIM:

1. A sulfur vulcanizable interpolymer comprising the interpolymer of ethylene, propylene and 5-ethylidene-2-norbornene, the interpolymer having the ethylene and propylene chemically bound therein in the mole ratio of about 80–95 moles ethylene to about 20–5 moles propylene, and containing the 5-ethylidene-2-norbornene chemically bound therein in an amount to provide an unsaturation level of at least 2.5 carbon to carbon double bonds per 1000 carbon atoms.

2. A sulfur vulcanizable interpolymer as claimed in claim 1 in which the ethylene/propylene is chemically bound in the interpolymer in the mole ratio of 80–90 moles ethylene to 20–10 moles propylene.

3. A sulfur vulcanizable interpolymer as claimed in claim 1 in which the unsaturation level is at least 5 carbon to carbon double bonds per 1000 carbon atoms.

4. A sulfur vulcanizable interpolymer as claimed in claim 1 in which the unsaturation level of the interpolymer is within the range of 2.5 to 30 carbon to carbon double bonds per 1000 carbon atoms.

5. A cured elastomer obtained by curing the interpolymer of claim 1 with a curing agent.

* * * * *